United States Patent
Osawa (10) Patent No.: US 11,088,636 B2
(45) Date of Patent: Aug. 10, 2021

(54) VIBRATION MOTOR AND LENS DRIVING DEVICE

(71) Applicant: CANON KABUSHIKI KAISHA, Tokyo (JP)

(72) Inventor: Kazuharu Osawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 16/246,365

(22) Filed: Jan. 11, 2019

(65) Prior Publication Data

US 2019/0222147 A1    Jul. 18, 2019

(30) Foreign Application Priority Data

Jan. 18, 2018    (JP) .............................. JP2018-006301

(51) Int. Cl.
*H02N 2/10* (2006.01)
*H02N 2/00* (2006.01)
*G02B 7/08* (2021.01)

(52) U.S. Cl.
CPC .............. *H02N 2/103* (2013.01); *G02B 7/08* (2013.01); *H02N 2/001* (2013.01); *H02N 2/0015* (2013.01); *H02N 2/0065* (2013.01); *H02N 2/006* (2013.01)

(58) Field of Classification Search
CPC .................................... G02B 7/08; G02B 7/04
See application file for complete search history.

(56) References Cited

U.S. PATENT DOCUMENTS

| 2004/0051981 A1* | 3/2004 | Nomura ................ G02B 7/026 359/822 |
| 2012/0206820 A1* | 8/2012 | Kim .................... G02B 15/142 359/701 |
| 2016/0118914 A1* | 4/2016 | Ifuku ..................... H01L 41/29 310/317 |

FOREIGN PATENT DOCUMENTS

| JP | 2004304887 A | 10/2004 |
| JP | 2005328628 A | 11/2005 |
| JP | 2014007917 A | 1/2014 |

* cited by examiner

*Primary Examiner* — Emily P Pham
(74) *Attorney, Agent, or Firm* — Canon U.S.A., Inc. I.P. Division (57) ABSTRACT

A vibration motor includes a vibrator, a friction member, and a pressurizing unit. The vibrator includes projecting portions and is vibrated by application of a driving voltage. The projecting portions are arranged in vicinities of nodes of the vibration, respectively. The friction member has a sliding surface formed of a curved surface with which the projecting portions come into contact. The pressurizing unit pressurizes the vibrator against the friction member with a pressurizing force. When the vibrator is vibrated, a driving force is generated in a tangential direction of the sliding surface by the vibration to drive the friction member relative to the vibrator, and each of the projecting portions generates an elliptic motion by the vibration. The elliptic motion is generated with an inclination at a predetermined angle with respect to the curved surface of the sliding surface.

10 Claims, 9 Drawing Sheets

VIBRATION MOTOR AND LENS DRIVING DEVICE

BACKGROUND OF THE INVENTION

Field

The present disclosure relates to a vibration motor, and to a lens driving device using the vibration motor.

Description of the Related Art

An ultrasonic motor has features in high output and quietness despite of a relatively small size. Therefore, the ultrasonic motor is used to, for example, drive a lens inside an interchangeable lens for a camera. There exists an ultrasonic motor using a vibrating reed type vibrator that is compatible with both a linear drive system and a rotary drive system. The ultrasonic motors disclosed in Japanese Patent Application Laid-Open No. 2004-304887 and Japanese Patent Application Laid-Open No. 2005-328628 are examples of the rotary drive type ultrasonic motor using the vibrating reed type vibrator. The vibrating reed type vibrator is arranged on a side surface of a friction member having a cylindrical shape. An elliptic motion generated by the vibrator is transmitted to the friction member so that the friction member is driven to rotate.

Regarding the vibrator, the vibrator should come into contact with the friction member at a point at which the elliptic motion is generated and at which a velocity (hereinafter referred to as "tangential velocity") is high. However, the tangential velocity at the point at which the elliptic motion is generated is not constant. Thus, there has been an issue in that drive efficiency is reduced when the vibrator comes into contact with the friction member at a point at which the tangential velocity is low.

SUMMARY OF THE INVENTION

In view of issues described above, the present disclosure provides information regarding a vibration motor having high drive efficiency.

According to an aspect of the present disclosure, a vibration motor includes a vibrator, which includes projecting portions and is vibrated by application of a driving voltage, wherein the projecting portions are arranged in vicinities of nodes of the vibration, respectively, a friction member, which has a sliding surface formed of a curved surface with which the projecting portions come into contact, and a pressurizing unit configured to pressurize the vibrator against the friction member with a pressurizing force, wherein, in a case where the vibrator is vibrated, a driving force is generated in a tangential direction of the sliding surface by the vibration to drive the friction member relative to the vibrator, and each of the projecting portions generates an elliptic motion by the vibration, and wherein, the elliptic motion is generated with an inclination at a predetermined angle with respect to the curved surface of the sliding surface.

Further features will become apparent from the following description of embodiments with reference to the attached drawings.

DESCRIPTION OF THE EMBODIMENTS

Embodiments will now be described in detail in accordance with the accompanying drawings.

Figure 1:
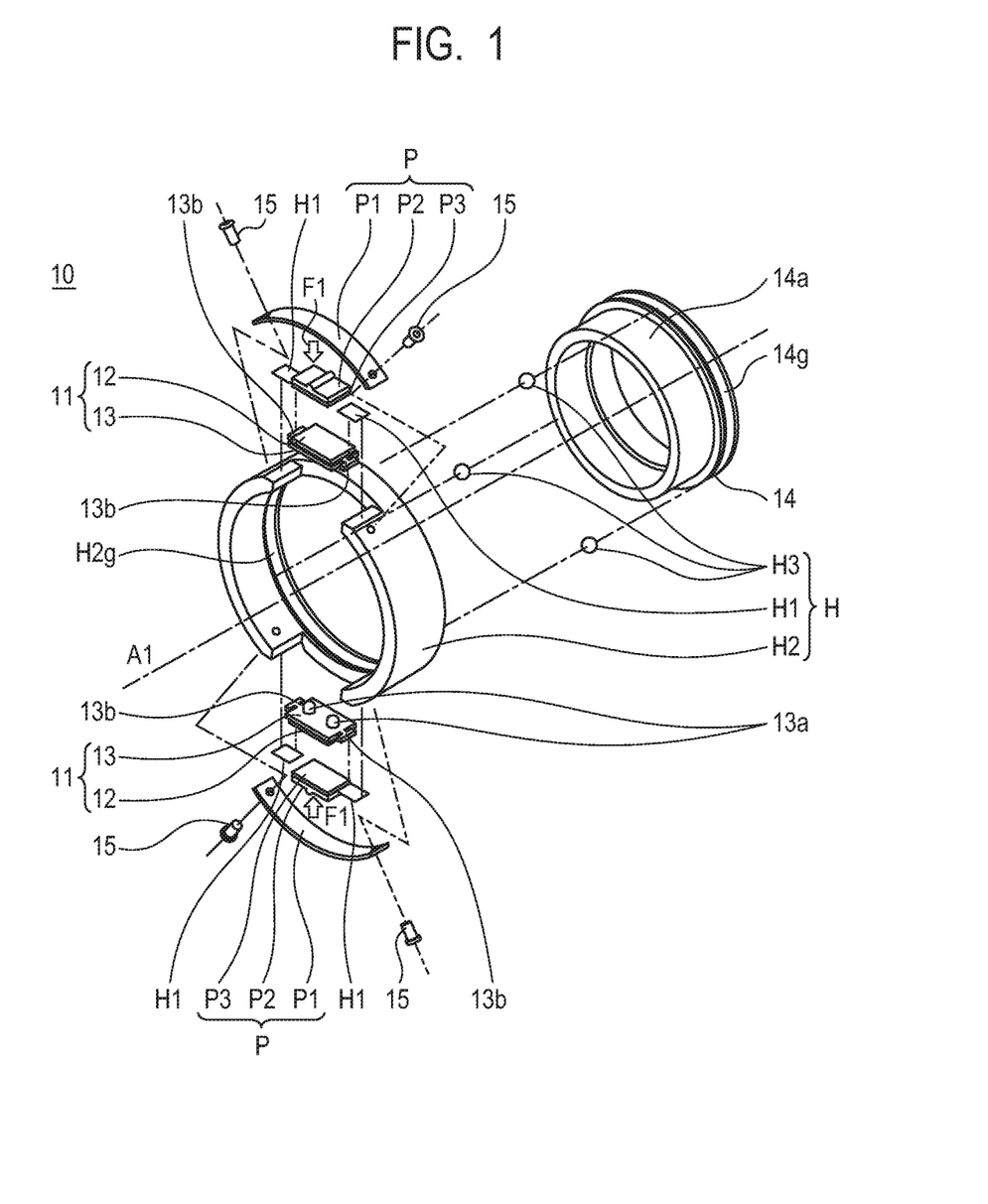
FIG. 1 is an exploded perspective view of a vibration motor (10).
Figure 2:
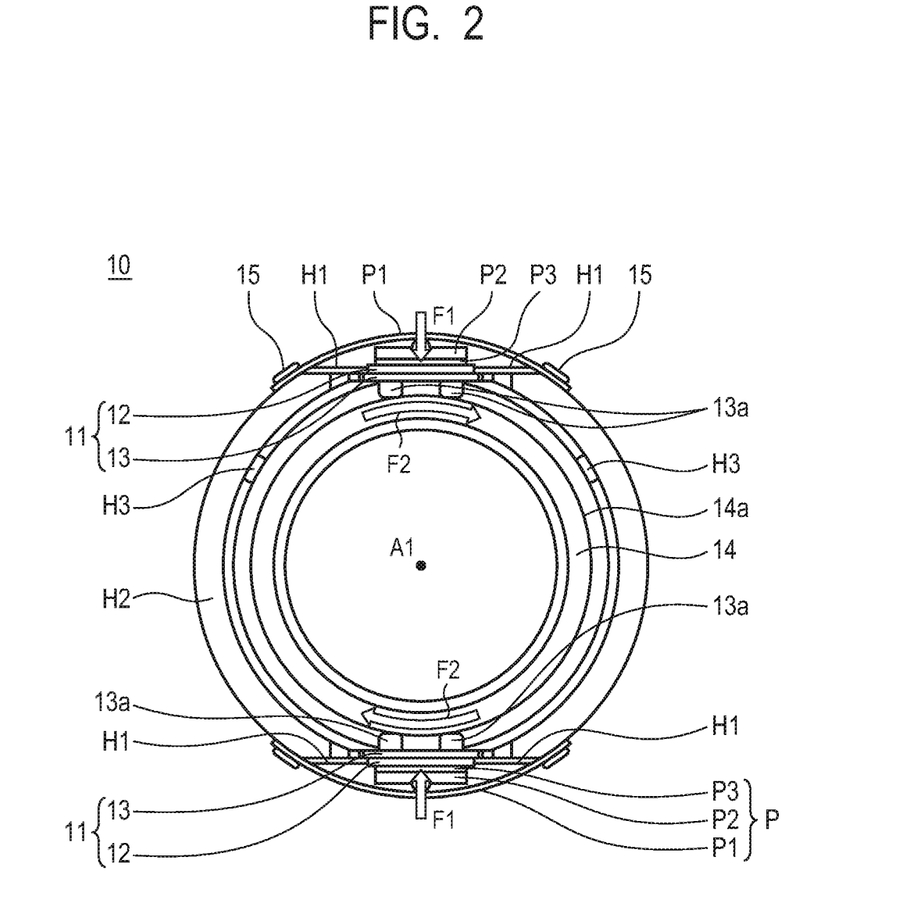
FIG. 2 is a front view of the vibration motor (10).

A vibration motor 10 (ultrasonic motor) is now described. FIG. 1 is an exploded perspective view of the vibration motor 10, and FIG. 2 is a front view of the vibration motor 10 as seen in a direction of a rotation axis A1 of rotary drive. The vibration motor 10 mainly includes vibrators 11, a friction member 14, a holding unit H for the vibrators 11 and the friction member 14, and pressurizing units P for the vibrators 11. The holding unit H includes holding plates H1, a fixing member H2, and rolling balls H3. Each of the pressurizing units P includes a pressurizing spring P1, a pressurizing plate P2, and a felt piece P3.

Each of the vibrators 11 has a structure in which, for example, a piezoelectric element 12 having a sheet-like shape and an elastic member 13 are bonded to each other. The piezoelectric element 12 is formed of, for example, lead zirconate titanate (PZR). The elastic member 13 is formed of, for example, a sheet metal of stainless steel. Each of the elastic members 13 includes two projecting portions 13a and held portions 13b. When an appropriate driving voltage (a high-frequency voltage having a frequency falling within an ultrasonic range) is applied to the piezoelectric element 12, the vibrator 11 causes high-frequency vibration (ultrasonic vibration) to generate an elliptic motion (EM) (FIG. 4) at a distal end of each of the projecting portions 13a. One end of each of the holding plates H1 is bonded and fixed to the corresponding held portion 13b of the vibrator 11, whereas another end of the holding plate H1 is bonded and fixed to the fixing member H2. Each of the holding plates H1 is, for example, a thin sheet metal, and couples the vibrator 11 to the fixing member H2 without inhibiting the vibration of the vibrator 11.

The friction member 14 is a metal member having a ring-like shape and has a sliding surface 14a with which the projecting portions 13a of the vibrators 11 come into contact. The sliding surface 14a is a curved surface having the rotation axis A1 of the friction member 14 as a curvature center or a curved surface having an axis that approximately matches the rotation axis A1 as a curvature center. The friction member 14 may have a curvature center at infinity and have the sliding surface 14a formed of a curved surface. The friction member 14 has a V-shaped groove 14g, whereas the fixing member H2 has a V-shaped groove H2g so as to correspond to the V-shaped groove 14g. The three rolling balls H3 are sandwiched between the V-shaped groove 14g and the V-shaped groove H2g so that the friction member 14 is held so as to be rotatable only about the rotation axis A1 relative to the fixing member H2. The holding plates H1, the fixing member H2, and the rolling balls H3 form the holding unit H.

Each of the pressurizing springs P1 is a plate spring and is fixed in an elastically deformed state to the fixing member H2 with screws 15. The vibrator 11 is pressurized against the friction member 14 through intermediation of the pressurizing plate P2 and the felt piece P3 with a pressurizing force F1 due to a reaction force generated by the elastic deformation of the pressurizing spring P1, thereby pressurizing the projecting portions 13a against the sliding surface 14a. The pressurizing spring P1, the pressurizing plate P2, and the felt piece P3 form the pressuring unit P.

In the configuration described above, when the vibrators 11 are vibrated so that each of the projecting portions 13a generates the elliptic motion EM (FIG. 4), a driving force F2 is generated in a tangential direction between the projecting portions 13a and the sliding surface 14a of the friction member 14 so that the friction member 14 can be relatively driven (to rotate) about the rotation axis A1. The vibration motor 10 is constructed of the members described above.

Figure 3A:
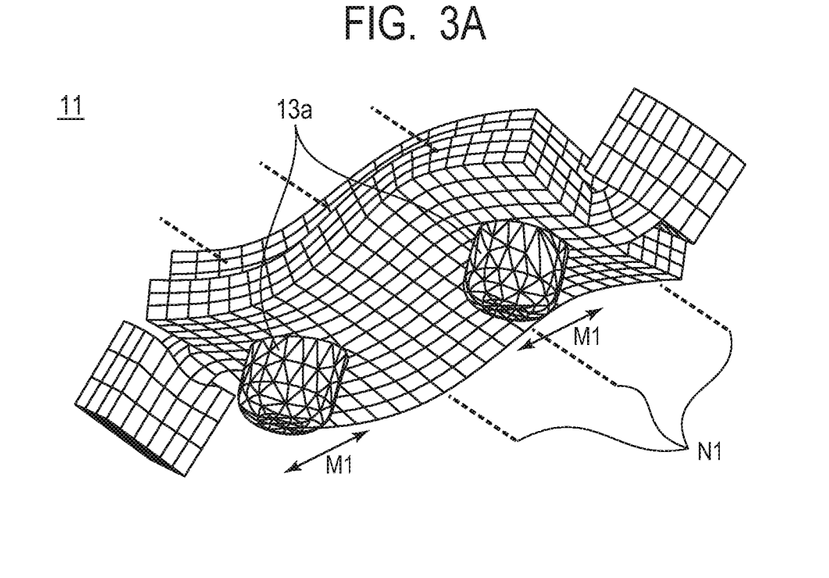
FIG. 3A and FIG. 3B are each a schematic view for illustrating a vibration mode of a vibrator (11).
Figure 3B:
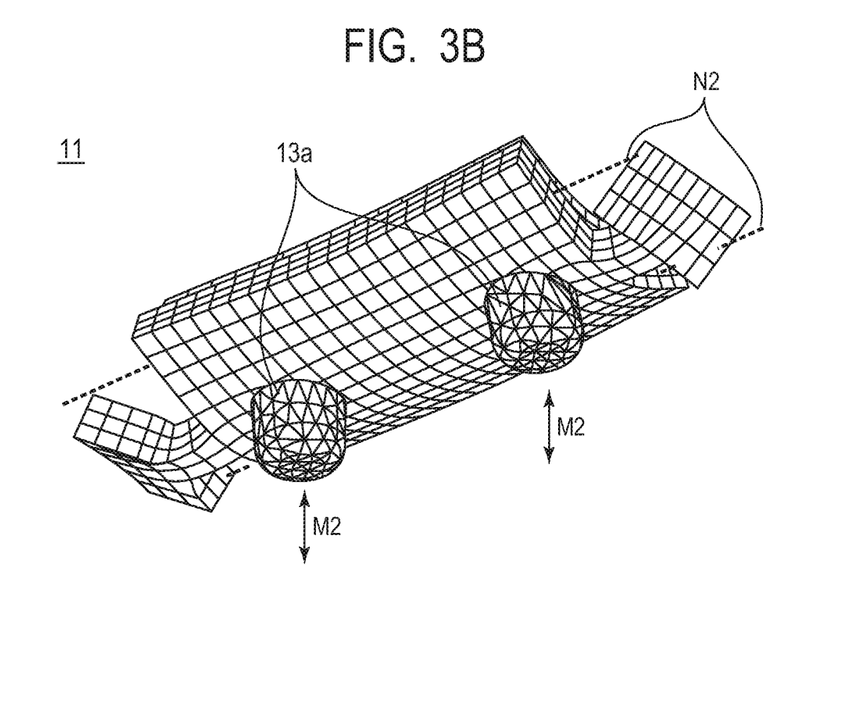

Vibration modes of the vibrators 11 of the vibration motor 10 are now described with reference to FIG. 3A and FIG. 3B. FIG. 3A is an illustration of vibration of the vibrator 11, which causes each of the projecting portions 13a of the vibrator 11 to generate a reciprocating motion M1 indicated by the arrows to displace the projecting portions 13a mainly in the tangential direction of the sliding surface 14a. The vibration described above is referred to as "first vibration". FIG. 3B is an illustration of vibration, which causes each of the projecting portions 13a to generate a reciprocating motion M2 indicated by the arrows to displace the projecting portions 13a mainly in a direction in which the projecting portions 13a are brought into contact with and separated from each other. The vibration described above is referred to as "second vibration". The first vibration has a plurality of nodes N1. In FIG. 3A, three nodes N1 are indicated by the broken lines. Two of the nodes N1 at both ends in a longitudinal direction of the vibrator 11 are positioned in the vicinities of the projecting portions 13a, respectively. The second vibration has a plurality of nodes N2. In FIG. 3B, two nodes N2 are indicated by the broken lines. Through generation of the first vibration and the second vibration at the same frequency, the elliptic motion EM is generated at a contact point 13c at which each of the projecting portions 13a is in contact with the sliding surface 14a. Details of a method of generating the first vibration and the second vibration are disclosed in Japanese Patent Application Laid-Open No. 2004-304887, and therefore detailed description thereof is herein omitted.

Figure 9:
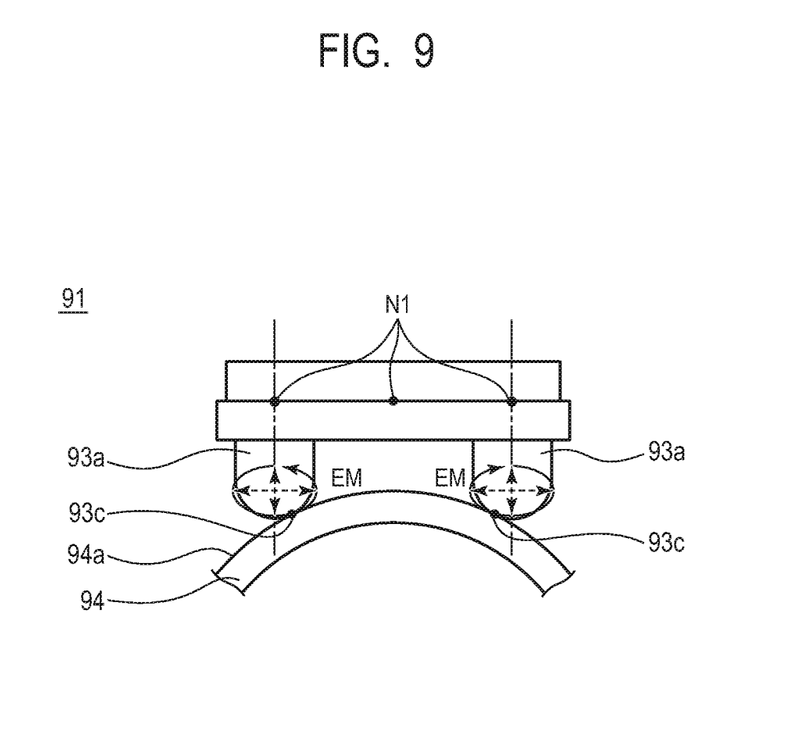
FIG. 9 is a view for illustrating a configuration of a related-art example.

Next, an ultrasonic motor in a related-art example is described. FIG. 9 is a view for illustrating a vibrator 91 and a friction member 94 of a relate-art ultrasonic motor. In the related-art ultrasonic motor, projecting portions 93a of the vibrator 91 are pressurized against a sliding surface 94a of the friction member 94.

In the vibrator 91, the projecting portions 93a are arranged immediately below the nodes N1 of the first vibration, which are positioned at both ends in the longitudinal direction of the vibrator 91. At this time, the elliptic motion EM generated at a contact point 93c at which each of the projecting portions 93a is in contact with the sliding surface 94a has an approximately symmetric shape in a vertical direction and a horizontal direction in FIG. 9. An inclination of the elliptic motion EM with respect to the sliding surface 94a is not taken into consideration. Hence, the projecting portion 93a cannot come into contact with the sliding surface 94a at a high velocity at the contact point 93c. As a result, drive efficiency is disadvantageously reduced.

Figure 4:
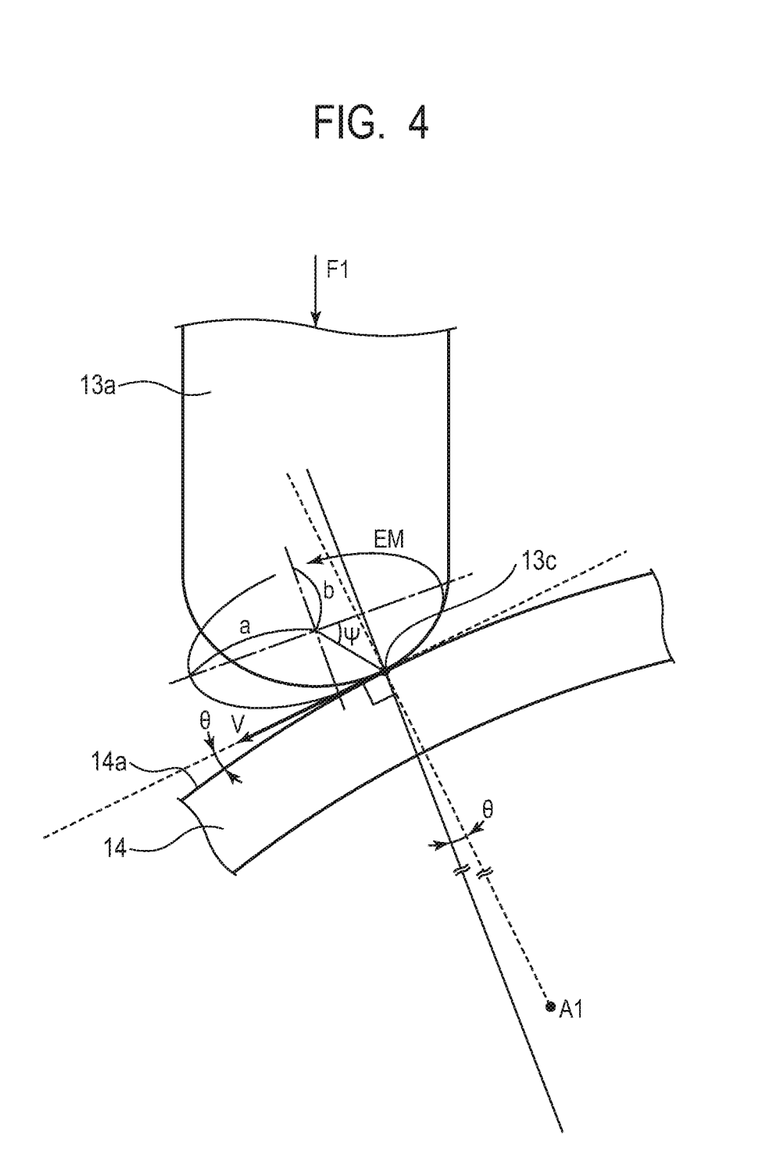
FIG. 4 is an enlarged view for illustrating an elliptic motion (EM) in a vicinity of a projecting portion (13a) of the vibration motor (10).

Next, the elliptic motion EM generated in each of the vibrators 11 of the vibration motor 10 is described. FIG. 4 is an enlarged view for illustrating the elliptic motion EM in a vicinity of the contact point 13c at which the projecting portion 13a is in contact with the sliding surface 14a. It is illustrated a state in which the elliptic motion EM is inclined with respect to the sliding surface 14a at an angle θ, that is the angle θ, which is formed between a broken line that passes through the rotation axis A1 and the contact point 13c and a solid line parallel to a short axis (amplitude b) of the elliptic motion EM. At this time, the projecting portion 13a comes into contact with the sliding surface 14a at such a point that an angle Ψ is formed between a long axis (amplitude a) of the elliptic motion EM and a line that passes through a center of the elliptic motion EM and the point. In this case, a velocity at the contact point 13c in the tangential direction is referred to as "tangential velocity V".

When an amplitude of the elliptic motion EM generated by the first vibration at the contact point 13c is an amplitude "a" and an amplitude of the elliptic motion EM generated by the second vibration at the contact point 13c is an amplitude "b", the tangential velocity V in the tangential direction at such a point that the angle Ψ is formed between the long axis (amplitude a) of the elliptic motion EM and the line that passes through the center of the elliptic motion EM and the point is expressed by Expression 1.

$$V=((2\pi af\sin(\Psi))2+(2\pi bf\cos(\Psi))2)^{1/2} \qquad \text{Expression 1}$$

A relationship between the angle θ and the angle Ψ is expressed by Expression 2.

$$\tan(\theta)=2\pi bf\cos(\Psi)/2\pi af\sin(\Psi)=b/a/\tan(\Psi) \qquad \text{Expression 2}$$

Figure 5:
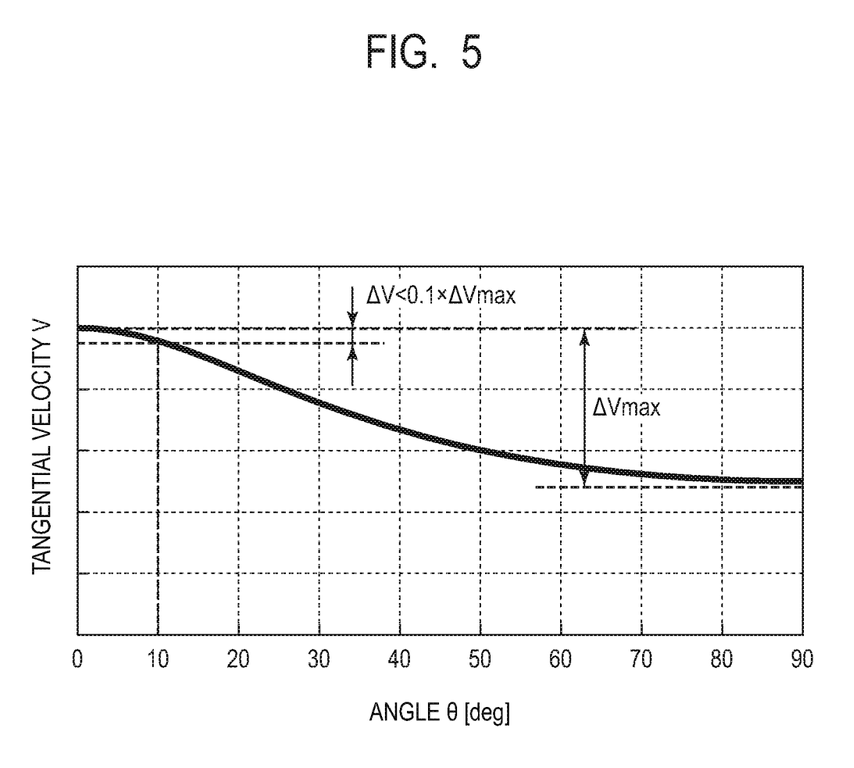
FIG. 5 is a graph for showing effects.

From Expression 1 and Expression 2, a relationship between the angle θ at which the elliptic motion EM is inclined with respect to the sliding surface 14a and the tangential velocity V at the contact position 13c is shown in FIG. 5. In general, when the vibration motor 10 is driven at high velocity, the amplitude "a" is set to be larger than the amplitude "b". Therefore, in FIG. 5, a ratio of the amplitude "a" and the amplitude "b" is calculated as a general value, that is, a:b=2:1. From FIG. 5, it can be understood that, as the angle θ is smaller, the tangential velocity is higher. Specifically, as the angle θ of the inclination of the sliding surface 14a with respect to the elliptic motion EM is smaller, the projecting portion 13a can come into contact with the sliding surface 14a at the contact point 13c at higher velocity. In the present disclosure, the angle θ of inclination is optimized so that the elliptic motion EM is generated at the predetermined angle θ with respect to the curved surface of the sliding surface 14a, thereby providing the vibration motor with high drive efficiency.

Example 1

Figure 6A:
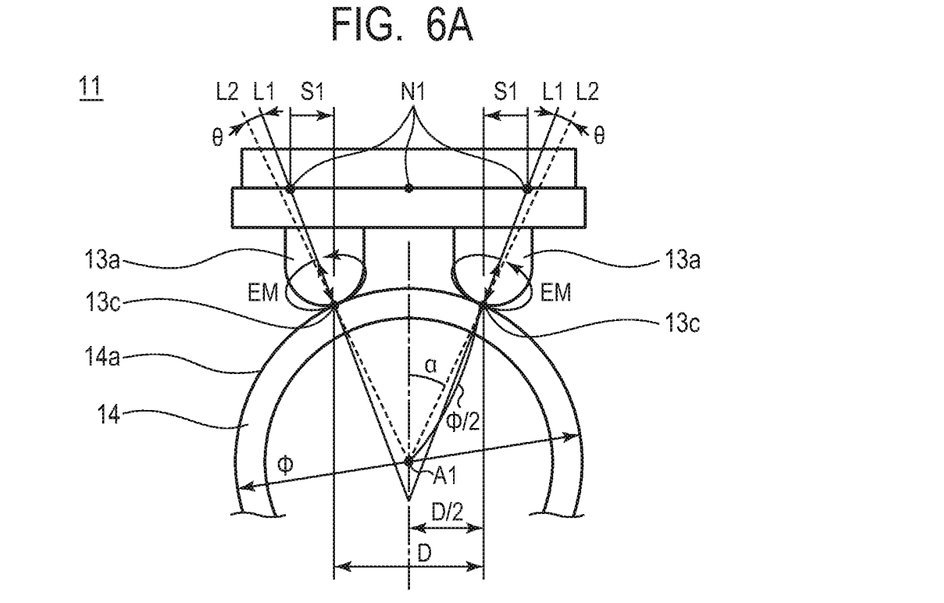
FIG. 6A is a view for illustrating a configuration of Example 1.

The vibration motor 10 of Example 1 is now described. FIG. 6A is a view for illustrating a configuration of the vibrator 11 of the vibration motor 10 of Example 1, and is an illustration of a state in which the projecting portions 13a are in contact with the friction member 14 as seen in a direction of the rotation axis A1. The contact point 13c at which each of the projecting portions 13a is in contact with the friction member 14 is offset inward from the corresponding node N1 of the first vibration in the tangential direction of the sliding surface 14a. With the configuration described above, the angle θ, which is formed between a first straight line L1 (solid line) that connects the node N1 of the first vibration and the contact portion 13c that is closest to the node N1 and an extension line (broken line) of a second straight line L2 that connects the rotation axis A1 being the curvature center of the sliding surface 14a and the contact point 13c, can be set to 10 degrees or smaller.

In the vibration motor 10 of Example 1, a geometrical relationship is achieved by offsetting the projecting portions 13a slightly inward from the corresponding nodes N1 of the first vibration so that the projecting portions 13a are positioned in the vicinities of the nodes N1 of the first vibration. Then, when each of the projecting portions 13a is arranged at a position offset from the corresponding node N1 of feeding vibration (first vibration), the elliptic motion EM generated at a distal end of each of the projecting portions 13a is inclined along the first straight line L1 as illustrated in FIG. 6A. Then, the angle at which the elliptic motion EM is inclined with respect to the sliding surface 14a can be optimized (reduced). Specifically, in Example 1, when the position of each of the projecting portions 13a is offset in the tangential direction of the sliding surface 14a, the angle θ formed between the first straight line L1 and the second straight line L2 can be adjusted. With the configuration described above, the elliptical motion EM can be generated while being inclined at a predetermined angle with respect to the curved surface of the sliding surface 14a, and hence the projecting portion 13a can come into contact with the sliding surface 14a at a point at which the tangential velocity V is high. Thus, the vibration motor 10 with high drive efficiency can be provided. Under a state in which the vibrator 11 is not vibrating, the contact point 13c is positioned offset from the corresponding node N1 of the first vibration in the tangential direction of the sliding surface 14a as seen in the direction of the rotation axis A1.

Next, effects of the vibration motor 10 of Example 1 are described. As shown in FIG. 5, the tangential velocity V decreases as the angle θ increases. At this time, a difference between a maximum value and a minimum value of the tangential velocity V is defined as a maximum velocity decrease amount ΔVmax. Then, when the angle θ is equal to or smaller than 10 degrees, a velocity decrease ΔV of the tangential velocity V can be reduced to be less than 10% of the maximum velocity decrease amount ΔVmax. In the related-art example, the angle θ has a large amount. Therefore, the tangential velocity V is low, and hence the drive efficiency is reduced. In the vibration motor 10 of Example 1, however, the high tangential velocity V can be achieved by setting the angle θ to 10 degrees or smaller. As described above, when the angle formed between the first straight line L1 and the extension line of the second straight line L2 is 10 degrees or smaller, each of the projecting portions 13a can come into contact with the friction member 14 at a position at which the velocity is sufficiently high in the elliptical motion EM. Thus, the friction member 14 can be driven to rotate with high efficiency.

A range in which the vibration motor 10 of Example 1 is particularly effective is now described. As illustrated in FIG. 6A, the sliding surface 14a has an approximately circular sectional shape when being cut along a plane orthogonal to the rotation axis A1. The approximately circular shape of the sliding surface 14a has a diameter Φ. Further, a distance between the contact points 13c on the two projecting portions 13a is defined as D. At this time, an angle α formed between a vertical line passing through the rotation axis A1 and a line passing through the rotation axis A1 and the contact point 13c, the distance D between the contact points 13c on the plane orthogonal to the rotation axis A1, and the diameter Φ of the sliding surface 14a satisfy Expression 3.

$$\sin \alpha = (D/2)/(\Phi/2) = D/\Phi \qquad \text{Expression 3}$$

When a relationship between the distance D and the diameter Φ, which allows the angle α to become 10 degrees or larger, is calculated from Expression 3, Expression 4 is obtained.

$$D/\Phi > 0.17 \qquad \text{Expression 4}$$

In a case in which the contact points 13c are not designed to be positively offset from the points immediately below the corresponding nodes N1 of the first vibration in the tangential direction of the sliding surface 14a, the sliding surface 14a is inclined with respect to the elliptic motion EM when the angle α is increased. Thus, the contact at the contact points 13c is facilitated. When the contact points 13c are not arranged offset from the points immediately below the corresponding nodes N1 of the first vibration, the angle θ becomes equal to or larger than 10 degrees when the angle α is 10 degrees or larger. Thus, the drive efficiency is reduced. As described above, even when the angle α is 10 degrees or larger, the friction member 14 can be driven to rotate with high efficiency by setting the angle θ to 10 degrees or smaller.

Modification Example 1

Figure 6B:
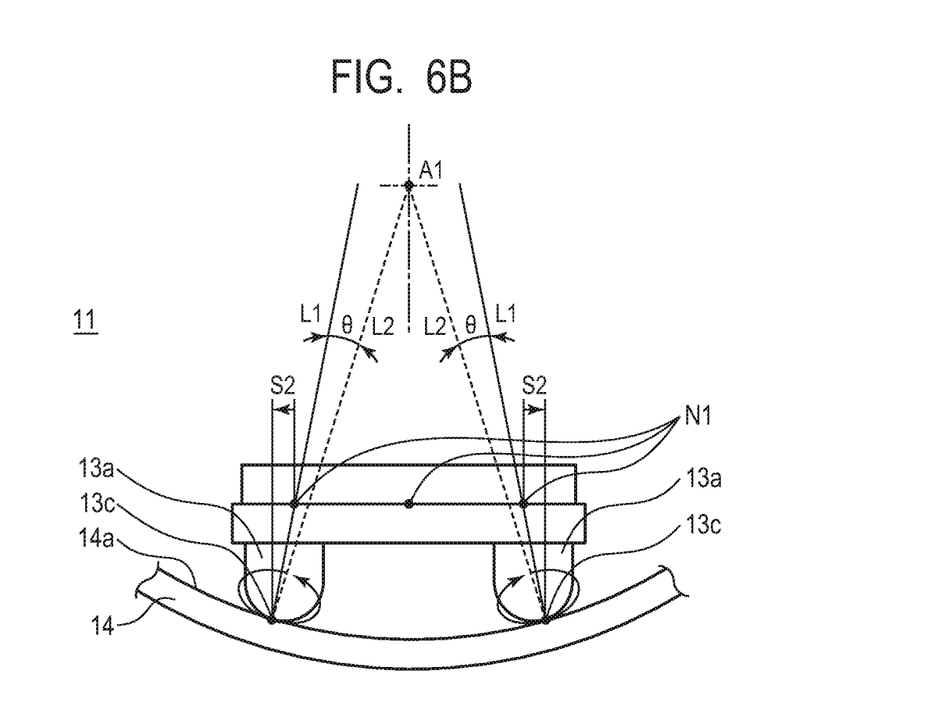
FIG. 6B is a view for illustrating Modification Example 1 of Example 1.

In Example 1, the rotary drive system for driving the friction member 14 to rotate is adopted with the arrangement of the vibrators 11 on the outer side surface of the friction member 14 having the ring-like shape. FIG. 6B is an illustration of Modification Example 1 of the rotary drive system for driving the friction member 14 to rotate with the arrangement of the vibrators 11 on an inner surface of the friction member 14. In Modification Example 1, the contact point 13c at which each of the projecting portions 13a is in contact with the sliding surface 14a is offset outward by a distance S2 in the tangential direction of the sliding surface 14a with respect to the corresponding node N1 of the first vibration. With the configuration described above, the angle θ, which is formed between a first straight line L1 (solid line) that connects the node N1 of the first vibration and the contact portion 13c that is closest to the node N1 and a second straight line L2 (broken line) that connects the rotation axis A1 being the curvature center of the sliding surface 14a and the contact point 13c, can be set to 10 degrees or smaller. With the configuration described above, the elliptical motion EM can be generated while being inclined at a predetermined angle with respect to the curved surface of the sliding surface 14a, and hence the projecting portion 13a can come into contact with the sliding surface 14a at a point at which the tangential velocity V is high. Thus, the vibration motor 10 with high drive efficiency can be provided.

Example 2

A vibration motor 20 of Example 2 is now described. A configuration of the vibration motor 20 is similar to that of Example 1. Specifically, the vibration motor 20 includes vibrators 21, a friction member 24, the holding unit H for the vibrators 21 and the friction member 24, and the pressurizing units P for the vibrators 21. A main configuration of the vibration motor 20 is the same as that of Example 1, and therefore description thereof is herein omitted.

Figure 7:
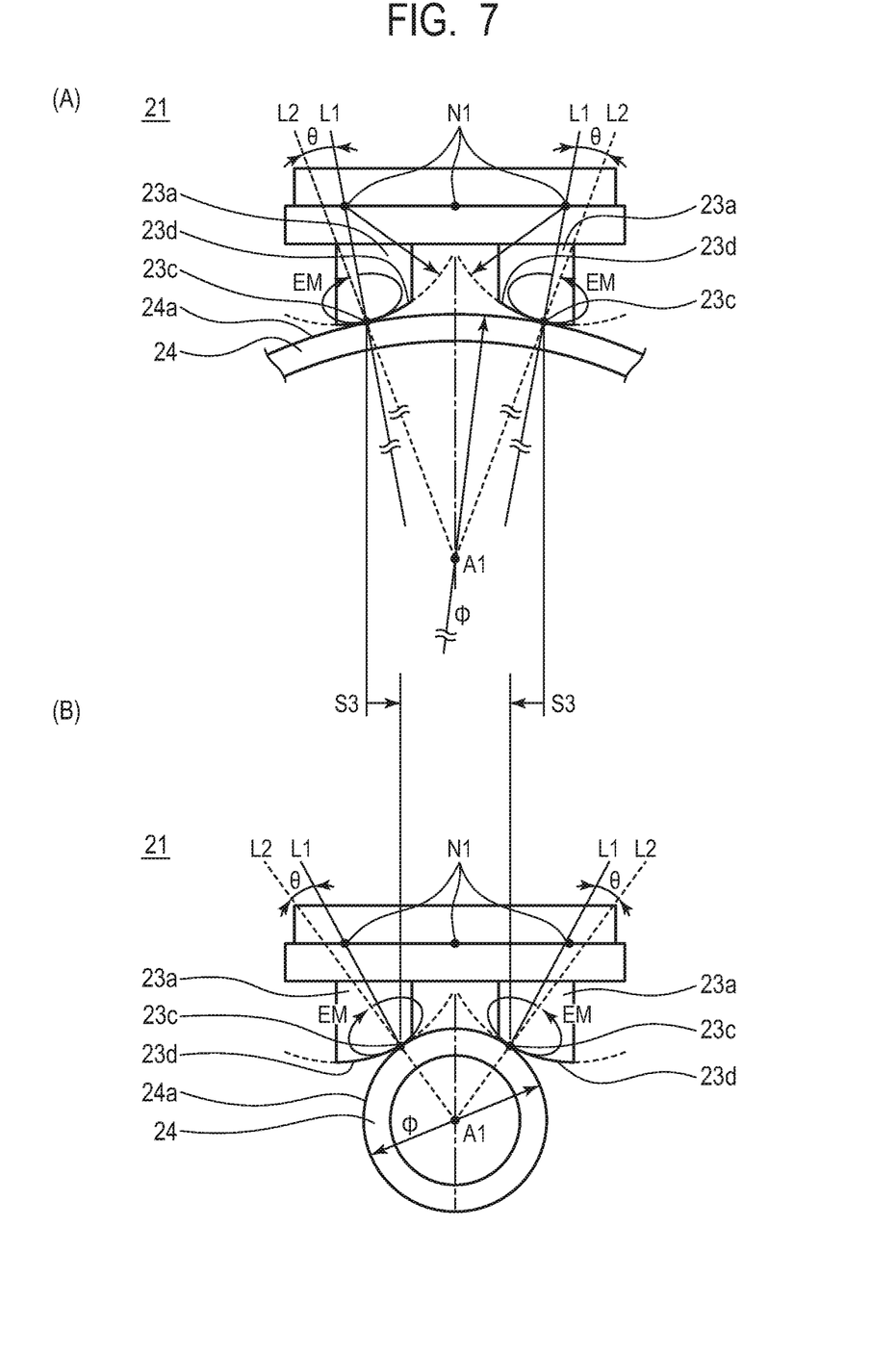
FIG. 7 is a view for illustrating a configuration of Example 2.

(A) in FIG. 7 is a view for illustrating a configuration of the vibrator 21 of the vibration motor 20 of Example 2, and is an illustration of a state in which projecting portions 23a are in contact with the friction member 24 as seen in the direction of the rotation axis A1. The vibrator 21 has the projecting portions 23a each having a curved shape 23d formed at a distal end thereof. The curved shape 23d has the node N1 of the first vibration as a curvature center. Example 2 differs from Example 1 in the above-mentioned configuration. Further, in Example 2, the curvature center of the curved shape 23d of the projecting portion 23a approximately matches the corresponding node N1 of the first vibration. With the configuration described above, the elliptical motion EM can be generated so as to be inclined at the predetermined angle with respect to the curved surface of the sliding surface 24a. Thus, the projecting portions 23a can come into contact with the sliding surface 24a at points at which the tangential velocity V is high. Thus, the vibration motor 20 with high drive efficiency can be provided.

Similarly to the vibrator 11 of the vibration motor 10 of Example 1, the contact points 23c at which the projecting portions 23a come into contact with the sliding surface 24a are offset inward from the corresponding nodes N1 of the first vibration by a distance S3 in the tangential direction of the sliding surface 24a. With the configuration described above, the angle θ, which is formed between the first straight line L1 (solid line) that connects the node N1 of the first vibration and the contact portion 23c that is closest to the node N1 and the extension line (broken line) of the second straight line L2 that connects the rotation axis A1 being the curvature center of the sliding surface 24a and the contact point 23c, can be set to 10 degrees or smaller.

In the vibration motor 20 of Example 2, a geometrical relationship is achieved by offsetting the projecting portions 23a slightly inward from the corresponding nodes N1 of the first vibration so that the projecting portions 23a are positioned in the vicinities of the nodes N1 of the first vibration. Then, when each of the projecting portions 23a is arranged at a position offset from the corresponding node N1 of feeding vibration (first vibration), the elliptic motion EM generated at a distal end of each of the projecting portions 23a is inclined along the first straight line L1 as illustrated in (A) in FIG. 7. The inclination of each of the elliptic motions EM with respect to the sliding surface 24a can be reduced. Specifically, in Example 2, the positions of the projecting portions 23a are offset in the tangential direction of the sliding surface 24a. As a result, the angle θ formed between the first straight line L1 and the extension line of the second straight line L2 can be adjusted. With the configuration described above, the elliptic motions EM can be generated with the inclination at the predetermined angle with respect to the curved surface of the sliding surface 24a. Thus, the projecting portions 23a can come into contact with the sliding surface 24a at the points at which the tangential velocity V is high. Thus, the vibration motor 20 with high drive efficiency can be provided.

Modification Example 2

In Example 1, the angle θ formed between the first straight line L1 and the extension line of the second straight line L2 can be adjusted by offsetting the positions of the projecting portions 13a in the tangential direction of the sliding surface 14a. However, each time the diameter Φ of the friction member 14 is changed, the positions of the projecting portions 13a of each of the vibrators 11 are required to be adjusted or another vibrator 11 is required to be additionally manufactured. On the other hand, with the curved shape 23d having the corresponding node N1 of the first vibrator as the curvature center, which is formed at the distal end of the projecting portion 23a as in the case of the vibrators 21 of Example 2, the contact point 23c is moved to an appropriate position without change in structure of the vibrator 21 when the diameter Φ of the friction member 24 is changed.

(A) in FIG. 7 is an illustration of a case in which the diameter Φ (curvature radius) of the friction member 24 is large, and (B) in FIG. 7 is an illustration of the vibrator 21 when the diameter Φ is small as Modification Example 2. When the diameter Φ is smaller than that in the case in which the diameter Φ is large, the contact points 23c are displaced inward in the vibrator 21 as indicated by the arrows S3. With the configuration described above, the angle θ formed between the first straight line L1 and the extension line of the second straight L2 can be maintained to 10 degrees or smaller.

Functions and effects of the vibration motors 20 of Example 2 and Modification Example 2 are now described. In the vibration motor 20, the projecting portions 23a can come into contact with the friction member 24 at the points at which the velocity is sufficiently high in the elliptic motions EM. Thus, the friction member 24 can be driven to rotate with high efficiency. Further, in the vibration motor 20, effects of driving the friction members 24 to rotate with the diameters Φ having a plurality of values in an efficient manner can be obtained without change in design of the vibrator 21. Further, as in Example 1, it is particularly effective for a motor that satisfies Expression 4.

Application Example

Figure 8:
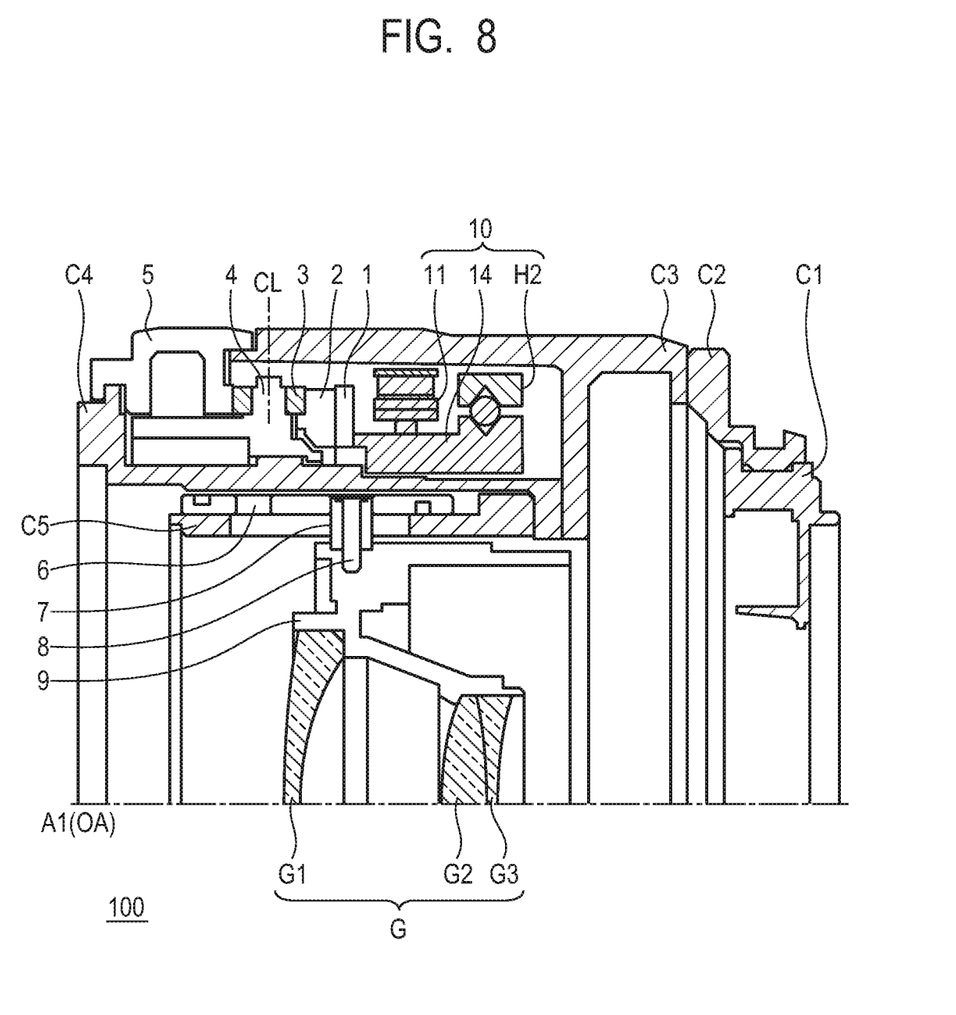
FIG. 8 is a sectional view for illustrating a lens driving device.

Next, a lens driving device to which the vibration motor 10 is applied is described. FIG. 8 is a sectional view of a lens barrel 100 as the lens driving device into which the vibration motor 10 is incorporated. The lens barrel 100 is removably mounted to a lens-interchangeable image pickup apparatus (not shown).

The vibration motor 10 is used as an actuator configured to drive a focus lens group G (lenses G1, G2, and G3 are collectively referred to as "optical lenses"), which is incorporated into the lens barrel 100. The lens barrel 100 has an approximately rotationally symmetric shape with respect to the rotation axis A1 of the actuator, which is an optical axis OA (rotation axis A1) of the lens barrel 100. Therefore, only an upper half of the lens barrel 100 is illustrated in FIG. 8. Illustration of lenses and lens barrel components other than the focus lens group G is omitted in FIG. 8.

The lens barrel 100 includes the vibration motor 10, fixed barrels C1 to C5, a buffer member 1, a rotary member 2, rotating rollers 3, a rotating roller holding member 4, a focus adjustment member 5, a cam barrel (cam mechanism) 6, a shaft member (engaged portion) 7, screws 8, a lens holding member 9, and the focus lens group G. In the lens barrel 100, the friction member 14 of the vibration motor 10 is arranged as a movable portion that can be driven to rotate about the optical axis OA as a center of rotation, whereas other members (such as the vibrators 11 and the fixing member H2) are arranged as fixed portions that cannot be driven to rotate.

The fixed barrels C1, C2, C3, and C4, which form a main body of the lens barrel 100, are coupled in the stated order with, for example, screws (not shown). The fixed barrel C3 holds the fixing member H2 of the vibration motor 10, whereas the fixed barrel C4 holds the friction member 14 being the movable portion in a rotatable state.

The buffer member 1 is fixed to the friction member 14 and is rotated integrally with the friction member 14. The rotary member 2 is also rotated integrally with the friction member 14 and the buffer member 1. Each of the rotating rollers 3 is rotated about a center line CL as a center of rotation and is held in contact with the rotary member 2 that is rotated integrally with the friction member 14. The rotating roller holding member 4 holds the rotating roller 3 in a rotatable manner and is rotated about the optical axis OA as a center of rotation. The focus adjustment member 5 can be directly operated by an operator and is rotated about the optical axis OA as a center of rotation.

The cam barrel 6 has a cam groove and is coupled to the rotating roller holding member 4 through intermediation of a groove portion (not shown) formed in the fixed barrel C4 so as to be rotated about the optical axis OA as the center of rotation simultaneously with the rotating roller holding member 4. The shaft member 7 is engaged with the cam groove formed in the cam barrel 6 and is fixed to the lens holding member 9 with the screws 8. The fixed barrel C5 (guiding mechanism) has a linear groove and is fixed to the fixed barrel C4. The fixed barrel C5 is engaged with the shaft member 7 through the linear groove. The shaft member 7 is linearly moved in the linear groove through rotational movement of the cam barrel 6.

The lens holding member 9 is configured to hold the focus lens group G and is arranged so as to be linearly movable through intermediation of the shaft member 7 with respect to the fixed barrel C5. Although the lens holding member 9 is held with the single shaft member 7 in FIG. 8, the lens holding member 9 may be held with the shaft members 7 that are arranged at three or more approximately equiangular positions.

With the configuration described above, the lens barrel 100 has the following moving mechanism. When the friction member 14 of the vibration motor 10 is rotated, the rotary member 2 is rotated in conjunction therewith. Along with the rotation of the rotary member 2, the rotating roller 3 rolls. At this time, the focus adjustment member 5 is immobilized through friction against the fixed barrels C3 and C4. At this time, along with the rolling of the rotating roller 3, the rotating roller holding member 4 is rotated about the optical axis OA as the center. As a result, the lens holding member 9 for the focus lens group G is linearly moved through intermediation of the cam barrel 6 and the fixed barrel C5.

Meanwhile, when the focus adjustment member 5 is operated, the friction member 14 of the vibration motor 10 is immobilized through friction. The rotary member 2, which is rotated in conjunction with the friction member 14, is also immobilized. At this time, as in the case in which the friction member 14 is rotated in the vibration motor 10, the lens holding member 9 for the focus lens group G can be linearly moved through the rolling of the rotating roller 3.

The lens driving device is the lens barrel 100 including the optical lenses, the lens holding member 9, which is configured to hold the optical lenses and has the engaged portion, the guiding mechanism, which is configured to linearly guide the lens holding member 9 in a direction of the optical axis OA, and the cam mechanism having the cam groove to be engaged with the engaged portion. Further, the cam mechanism is indirectly rotated through intermediation of the plurality of components by the rotary drive of the vibration motor 10 to drive the optical lenses. Even when an outer diameter of the lens is reduced, the lens barrel 100 can maintain high drive efficiency owing to the vibration motor 10 which can deal with the reduction of the diameter.

Although the driving force F2 of the vibration motor 10 is indirectly transmitted to the cam mechanism through intermediation of the plurality of components to rotate the cam mechanism in the lens barrel 100, for example, the friction member 14 of the vibration motor 10 may be directly fixed to the cam barrel 6 so as to directly drive the cam mechanism.

The vibration motor 10 to be used for the lens driving device may be applied to the vibration motor 10 that satisfies Expression 4, as in the case of Example 1. In the lens driving device, the vibration motor 20 including the projecting portions 23a each having a curved surface may be used. The curved surface having the node N1 of the first vibration as the curvature center as seen in the direction of the rotation axis may be formed at the distal end of the projecting portion 23a, which is a feature of Example 2. Further, in the lens driving device, Modification Example 1 and Modification Example 2 may be used.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-006301, filed Jan. 18, 2018, which is hereby incorporated by reference herein in its entirety.

What is claimed is:
1. A vibration motor comprising:
  a vibrator, which includes projecting portions and is vibrated by application of a driving voltage, wherein the projecting portions are arranged in vicinities of nodes of a vibration, respectively;
  a friction member, which has a sliding surface formed of a curved surface with which the projecting portions come into contact; and
  a pressurizing unit configured to pressurize the vibrator against the friction member with a pressurizing force,
  wherein when the vibrator is vibrated, a driving force is generated in a tangential direction of the sliding surface by the vibration to drive the friction member relative to the vibrator, and each of the projecting portions generates an elliptic motion by the vibration, and
  wherein the elliptic motion is generated with an inclination at a predetermined angle with respect to the curved surface of the sliding surface.

2. The vibration motor according to claim 1, wherein a distal end of each of the projecting portions is formed to have a curved shape, and the elliptic motion is generated with the inclination when a curvature center of the curved shape approximately matches a corresponding one of the nodes.

3. The vibration motor according to claim 1,
  wherein, when the vibrator is vibrated, the friction member is rotated about a rotation axis relative to the vibrator,
  wherein the curved surface has an axis that approximately matches the rotation axis as a curvature center,
  wherein a contact point at which each of the projecting portions comes into contact with the sliding surface is arranged at a position offset from a corresponding one of the nodes of the vibration in the tangential direction of the sliding surface as seen in a direction of the rotation axis, and wherein the elliptic motion is generated with the inclination by setting an angle formed between a first straight line that connects the contact point and one of the nodes, which is closest to a contact portion, and an extension line of a second straight line that connects the rotation axis and the contact point to 10 degrees or smaller.

4. The vibration motor according to claim 3, wherein, when a distance between the contact points of the projecting portions is D, the sliding surface cut along a plane orthogonal to the rotation axis has a circular shape, and a diameter of the circular shape is Φ, $D/\Phi > 0.17$ is satisfied.

5. The vibration motor according to claim 3, wherein each of the contact points is positioned offset from a corresponding one of the nodes of the vibration in the tangential direction of the sliding surface as seen in the direction of the rotation axis under a state in which no vibration is generated by the vibrator.

6. The vibration motor according to claim 1, wherein the vibrator includes at least two projecting portions.

7. The vibration motor according to claim 1, wherein the vibration includes first vibration that displaces each of the projecting portions in the tangential direction of the sliding surface.

8. The vibration motor according to claim 1, wherein the friction member is a ring-shaped friction member.

9. The vibration motor according to claim 1, wherein the vibration includes high-frequency vibration at a frequency falling within an ultrasonic range, and the vibration motor includes an ultrasonic motor.

10. A lens driving device comprising:
a vibration motor including:
   a vibrator, which includes projecting portions and is vibrated by application of a driving voltage, wherein the projecting portions are arranged in vicinities of nodes of a vibration, respectively,
   a friction member, which has a sliding surface formed of a curved surface with which the projecting portions come into contact, and
   a pressurizing unit configured to pressurize the vibrator against the friction member with a pressurizing force,
   wherein when the vibrator is vibrated, a driving force is generated in a tangential direction of the sliding surface by the vibration to drive the friction member relative to the vibrator, and each of the projecting portions generates an elliptic motion by the vibration, and
   wherein the elliptic motion is generated with an inclination at a predetermined angle with respect to the curved surface of the sliding surface;
an optical lens;
a lens holding member, which is configured to hold the optical lens and has an engaged portion;
a guiding mechanism configured to linearly guide the lens holding member in a direction of an optical axis of the optical lens; and
a cam mechanism, which has a cam groove to be engaged with the engaged portion,
wherein the optical lens is driven along the guiding mechanism by driving the cam mechanism to rotate in any one of a direct manner and an indirect manner by using the vibration motor.

* * * * *